US012738736B2

(12) United States Patent
Pflaum et al.

(10) Patent No.: US 12,738,736 B2
(45) Date of Patent: Sep. 15, 2026

(54) METHODS AND SYSTEMS FOR CONTROLLING A CHP DEVICE IN A MICROGRID

(71) Applicant: Schneider Electric Industries SAS, Rueil Malmaison (FR)

(72) Inventors: Peter Pflaum, Meylan (FR); Alejandro Yousef Da Silva, Paris (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 581 days.

(21) Appl. No.: 18/139,984

(22) Filed: Apr. 27, 2023

(65) Prior Publication Data

US 2024/0088655 A1 Mar. 14, 2024

(30) Foreign Application Priority Data

Apr. 28, 2022 (EP) .................................... 22170454

(51) Int. Cl.
*H02J 3/00* (2026.01)
*H02J 103/30* (2026.01)

(52) U.S. Cl.
CPC ........... *H02J 3/003* (2020.01); *H02J 2103/30* (2026.01)

(58) Field of Classification Search
CPC .. H02J 3/003; H02J 2203/20; H02J 13/00002; H02J 3/381; H02J 3/466; G05B 13/042; G06F 17/11
See application file for complete search history.

(56) References Cited

U.S. PATENT DOCUMENTS

2010/0324962 A1* 12/2010 Nesler ....................... G05F 1/66 705/412
2012/0259583 A1* 10/2012 Noboa .................. G05B 15/02 702/179
2013/0085616 A1* 4/2013 Wenzel .................... G05F 1/66 700/278
2015/0027659 A1* 1/2015 Marques Dias Pinto .................. F24D 11/003 165/10
2016/0248251 A1* 8/2016 Tinnakornsrisuphap .................. H02J 3/38
2017/0342940 A1* 11/2017 Scuderi ............... H02K 7/1807
(Continued)

FOREIGN PATENT DOCUMENTS

CN 206625899 U 11/2017

OTHER PUBLICATIONS

Hirsch, A. et al., "Microgrids: A review of technologies, key drivers, and outstanding issues", Renewable and Sustainable Energy Reviews, vol. 90, pp. 402-411, 2018.
(Continued)

*Primary Examiner* — Ziaul Karim
(74) *Attorney, Agent, or Firm* — Kinney & Lange, P.A.

(57) ABSTRACT

A method for controlling a combined heat and power device of a microgrid. The method includes at least setting a CHP efficiency target corresponding to a minimum value of the CHP efficiency over an evaluation period; updating historical data regarding the microgrid over a time step; computing a value of the CHP efficiency based on the updated historical data; comparing the CHP efficiency target and the computed CHP efficiency value; and updating an efficiency weight parameter based on the comparison to achieve the CHP efficiency target over the evaluation period.

13 Claims, 6 Drawing Sheets

(56) References Cited

U.S. PATENT DOCUMENTS

| | | | | |
|---|---|---|---|---|
| 2018/0252428 | A1* | 9/2018 | Malcolm | F24F 11/46 |
| 2020/0088450 | A1* | 3/2020 | Watson | F24D 5/12 |

OTHER PUBLICATIONS

Parisio, A. et al., "A robust optimization approach to energy hub management", International Journal of Electrical Power & Energy Systems, vol. 42, issue 1, pp. 98-104, 2012.

European Search Report and Search Opinion dated Oct. 12, 2022 for corresponding European Patent Application No. EP22170454.7, 8 pages.

* cited by examiner

METHODS AND SYSTEMS FOR CONTROLLING A CHP DEVICE IN A MICROGRID

The present application relates to a Model Predictive Control (MPC)-based energy management system comprising Combined Heat and Power (CHP) generation.

TECHNICAL FIELD

The present disclosure relates to microgrids. More particularly, aspects of the present disclosure relate to a system and method for energy management in a microgrid.

BACKGROUND ART

A microgrid can be a small local grid, which can include various energy sources. For example, a microgrid can include a wind generator, a solar generator, a diesel generator, and other power generators. The microgrid also includes loads. For example, the microgrid can include a building, a data center, a harbor, an industrial site, a campus, or even a small town. The microgrid can also be connected to a larger grid, such as a power utility. The utility can for example provide additional power to the loads and/or to improve reliability.

In some embodiments, a microgrid can more particularly integrate Combined Heat and Power (CHP) generation. CHP is an energy technology that generates electricity and captures the heat that would otherwise be wasted to provide useful thermal energy (such as steam or hot water) that can be used for space heating, cooling, domestic hot water and industrial processes. A CHP device is typically located at facilities where there is a need for both electricity and thermal energy. To be particularly efficient, CHP efficiency must be greater than a preconfigured threshold over a long time horizon (e.g. a full year). However, CHP efficiency is not always easy to control as it may depend on various external factors that can be difficult to determine or to predict.

While a number of advances have been made in the field of microgrids and power generation to this end, it will be readily appreciated that improvements are continually needed.

It is an object of the invention to alleviate these challenges of microgrid energy management, by guaranteeing an overall satisfactory efficiency of a CHP device.

SUMMARY OF THE DISCLOSURE

This summary is provided to introduce concepts related to the present inventive subject matter. This summary is not intended to identify essential features of the claimed subject matter nor is it intended for use in determining or limiting the scope of the claimed subject matter.

In one aspect, the invention relates to a method for controlling a Combined Heat and Power (CHP) device of a microgrid, the method comprising at least the steps of:

a) setting a CHP efficiency target corresponding to a minimum value of the CHP efficiency over an evaluation period;
b) updating historical data regarding the microgrid over a time step;
c) computing a value of the CHP efficiency based on the updated historical data;
d) comparing the CHP efficiency target and the computed CHP efficiency value; and
e) updating an efficiency weight parameter based on the comparison to achieve the CHP efficiency target over the evaluation period.

This method provides the ability to efficiently manage the CHP device in the microgrid by focusing the optimization on the CHP output while taking into account historical and forecast data.

Compared with a single electrical or heat load demand following method, the flexibility of the CHP microgrid system is improved, and the system operation cost can be reduced significantly.

In general, in yet another aspect, the present disclosure relates to a microgrid controller installed at a microgrid site and operable to control a CHP device of the microgrid. The microgrid controller comprises, among other things, a processor and a storage device coupled to the processor and storing computer-readable instructions for performing a control objective function thereon. The control objective function causes the microgrid controller to determine CHP control setpoints to achieve a minimum target efficiency according to one or more embodiments disclosed herein.

Particular embodiments of the invention are set forth in the dependent claims.

A non-transitory computer-readable medium containing program logic that, when executed by operation of one or more computer processors, performs CHP control according to one or more embodiments disclosed herein.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification. The drawings, together with the remainder of the specification, serve to describe and explain the claimed aspects and embodiments.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
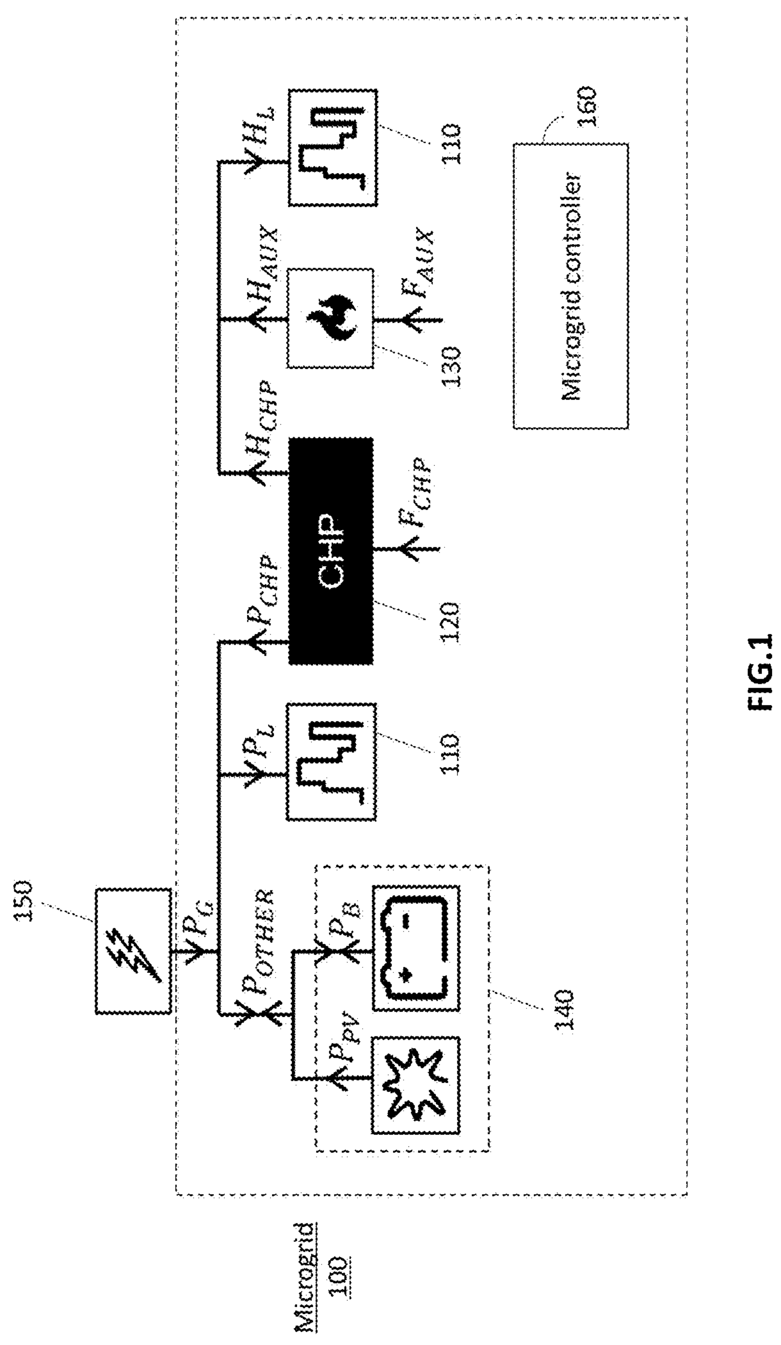
FIG. 1 is a block diagram illustrating a microgrid according to an embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

It is noted that, as used un this specification and the appended claims, the singular forms "a", "an, and "the", and any singular use of any word, include plural references unless expressly and unequivocally limited to one reference. The terms "including", "comprising", "containing", "involving" and variations thereof herein, is meant to encompass the items listed thereafter, equivalents thereof, and additional items, as well as alternate embodiments consisting of the items listed thereafter exclusively.

At a high level, embodiments of the present disclosure provide systems and method for control of microgrid operations, and more particularly of a CHP device using MPC-based energy management. The term "Model predictive control (MPC)" as used herein generally refers to a method of process control that is used to control a process by deploying a model and a control objective function while satisfying a set of physical constraints. The term "energy management" as used herein generally refers to monitoring, controlling, and optimizing the performance of the microgrid, and more particularly of the CHP device.

The disclosed systems and method deploy models and control objective function on an edge device, such as the microgrid controller, at the microgrid location or site. The term "edge device" as used herein refers to devices that are designed to provide access or entry to a network, such as a local area network (LAN), wide area network (WAN), metropolitan area network (MAN), and the like. Being able to perform MPC-based energy management on edge devices provides numerous benefits, especially for a remotely located microgrid where computing resources usually required for MPC modeling may not otherwise be available. In such cases (and other cases), performing MPC modeling on an edge device allows operators to proactively manage the remote microgrid.

Being able to perform MPC on a microgrid controller provides numerous benefits. It allows to rely on dynamic models of the process, most often linear empirical models obtained by system identification. As it will be detailed below, it also allows a current time window to be optimized, while taking a more global time period into account. This is achieved by optimizing a finite time-horizon, but only implementing the current timeslot and then optimizing again, repeatedly. Also, MPC has the ability to anticipate future events, such as economic operations of cogeneration, and can take appropriate control actions accordingly. However, as a variant and although not described in more details below, the microgrid controller may be hosted in the cloud and may interface with a device on-site which sends the setpoints to the CHP device.

A microgrid can include multiple distributed energy sources adapted to output or store electric power. In order to be electrically connected together, advantageously in parallel, to the microgrid, the energy sources must each be capable of delivering an electrical signal of the same frequency and the same voltage. The energy sources can include one or several renewable energy sources, such as a solar generator, which generally generate an electrical signal (an electric frequency and a voltage). The energy sources can also include one or several generators that can use fossil fuels such as coal, oil, and natural gas to generate electricity. The microgrid can also include one or several energy storage sources, which may be, for example, a battery, or a plurality of batteries electrically connected to each other. If multiple batteries are used, they may be connected in series or in parallel to produce resultant voltages different from the voltage of the individual battery units. The microgrid can also include one or more loads that are supplied in energy by the energy sources.

According to the embodiments of the present disclosure, the microgrid also includes one or more CHP devices to supply continuous thermal and electric energy, for instance by utilizing natural gas infrastructure. CHP devices can be combustion turbines, or reciprocating engines, with heat recovery unit or steam boilers with steam turbine.

Referring now to FIG. 1, a schematic diagram of an exemplary microgrid 100 having MPC-based energy management capabilities is shown according to an embodiment of the present disclosure. As can be seen, the microgrid 100 consists of an electrical and a thermal load 110, a CHP device 120, an optional auxiliary heat source 130 (e.g. a boiler) and additional energy sources 140 such as a photovoltaic (PV) system and a battery.

According to this exemplary microgrid, each energy source provides an electricity output (e.g. produces energy), the battery 140 may also receive electricity for storage. The loads receive electricity and/or thermal inputs $P_L$, $H_L$ (e.g. consume energy). The CHP device receives a fuel energy input $F_{CHP}$ and can provide both electric and thermal outputs $P_{CHP}$, $H_{CHP}$. Similarly, the optional auxiliary heat source 130 receives a fuel energy input $F_{AUX}$ and provides a thermal output $H_{AUX}$.

The microgrid 100 can operate in an island mode because of economic issues or geographical position. An "off-grid" microgrid can be built in areas that are far distant from any transmission and distribution infrastructure and, therefore, have no connection to the utility grid.

More preferably, as also illustrated on FIG. 1, the microgrid 100 can also exchange power with the main network. An "on-grid" microgrid 100 is connected to a utility grid 150, including a power utility. When the microgrid cannot meet user's electrical load demand, a system operator can purchase power from the utility grid 150 to meet the user load, otherwise, the microgrid operation can sell excess electricity to a main network for additional profit. Also, microgrid operation can be subject to a utility tariff composed of a variable time-of-use rate and a demand charge rate. To this end, the microgrid 100 may communicate with an energy provider of the utility grid 150 through a utility portal.

As also illustrated on FIG. 1, the microgrid 100 includes a microgrid controller 160. Among other functions, the microgrid controller 160 is adapted to compute the control objective function and determine CHP control setpoints to achieve a minimum efficiency according to one or more embodiments disclosed herein.

The microgrid controller 160 gathers measures M that consist in historical data D about various aspects of the microgrid for monitoring and tracking purposes. The microgrid controller 160 collects on CHP operation, including electricity and heat powers. The microgrid controller 160 also collects measurements from various wireless and wired field sensors (not expressly shown) around the microgrid and of the other energy sources. Other data collected by the microgrid controller 160 from the field sensors may include fluid flow rate, temperature, pressure, and the like.

The microgrid controller 160 also gathers forecast data F. According to an embodiment, forecast data F corresponds to forecasted electric and thermal energy consumption of the loads of the microgrid over a forecast period. The forecast period can be at the hourly level for the next hour, the next day and/or the remainder of the month. Due to the intermittent nature of renewable energy sources that can be used in the microgrid, such as wind energy or solar energy, these forecast data F may be dependent on weather forecasts or any other forecast end-use and total premise loads, energy costs, energy prices, avoided costs and renewable resource generation.

The microgrid controller 160 may provide a network access or entry point to communicate collected historical data D or obtain forecast data F to and from an external system, such as a supervisory control and data acquisition (SCADA) system and/or a network (e.g., the Internet). The controller transmits and receives data to and from the external system as needed over a communication link (e.g., Ethernet, Wi-Fi, Bluetooth, GPRS, CDMA, etc.). From there, the data may be forwarded to other systems within an enterprise and/or to the cloud further processing as needed. Any type of edge device or appliance may be used as the microgrid controller 160 provided the device has sufficient processing capacity for the purposes discussed herein. Examples of suitable edge devices include gateways, routers, routing switches, integrated access devices (IADs), and various MAN and WAN access devices. In accordance with embodiments of the present disclosure, the microgrid controller 160 is provided with the capability to perform MPC-based energy management, as discussed herein.

Figure 2:
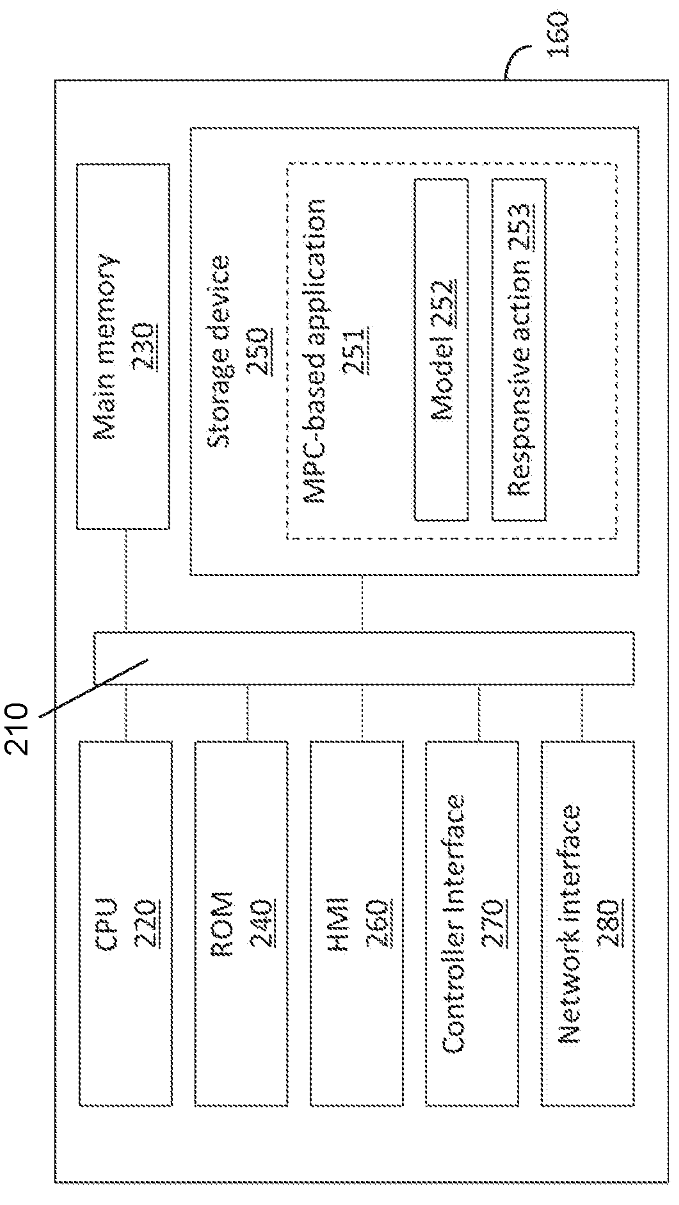
FIG. 2 is a block diagram for an exemplary microgrid controller according to an embodiment of the present disclosure.

FIG. 2 is a block diagram illustrating an exemplary hardware architecture for the microgrid controller 160 in accordance with embodiments of the present disclosure. In one embodiment, the microgrid controller 160 includes a bus 210 or other communication pathway for transferring information, and a CPU 220, such as an ARM microprocessor, coupled with the bus 210 for processing the information. The microgrid controller 160 may also include a main memory 230, such as a random-access memory (RAM) or other dynamic storage device coupled to the bus 210 for storing computer-readable instructions to be executed by the CPU 220. The main memory 230 may also be used for storing temporary variables or other intermediate information during execution of the instructions executed by the CPU 220.

The microgrid controller 160 may further include a read-only memory (ROM) 240 or other static storage device coupled to the bus for storing static information and instructions for the CPU 220. A computer-readable storage device 250, such as a nonvolatile memory (e.g., Flash memory) drive or magnetic disk, may be coupled to the bus 210 for storing information and instructions for the CPU. The CPU 220 may also be coupled via the bus 210 to a human-machine interface 260 (HMI), such as a touchscreen interface, for displaying information to a user and allowing the user to interact with the microgrid controller 160. An interface 270 may be coupled to the bus 210 for allowing the controller to communicate with the microgrid controller 160. A network or communication interface 280 may be provided for allowing the microgrid controller 160 to communicate with the external system, such as the SCADA system and/or the network.

The term "computer-readable instructions" as used above refers to any instructions that may be performed by the CPU 220 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media may include, for example, optical or magnetic disks, such as the storage device. Volatile media may include dynamic memory, such as main memory. Transmission media may include coaxial cables, copper wire and fiber optics, including wires of the bus. Transmission itself may take the form of electromagnetic, acoustic, or light waves, such as those generated during radio frequency (RF) and infrared (IR) data communications. Common forms of computer-readable media may include, for example, magnetic medium, optical medium, memory chip, and any other medium from which a computer can read.

A MPC-based application 251, or rather the computer-readable instructions therefor, may also reside on or be downloaded to the storage device 250. The MPC-based application 251 may be executed by the CPU 220 and/or other components of the microgrid controller 160 to perform linear or non-linear computation to deploy the control objective function. Such MPC-based application 251 may be written in any suitable computer programming language known to those skilled in the art using any suitable software development environment known. Examples of suitable programming languages may include C, C++, C#, Python, Java, Perl, and the like.

The MPC-based application 251 also deploys a model 252 of the microgrid, such as of the embodiment of FIG. 1, and more particularly of the energy sources and loads, to take control actions 252.

For sake of simplicity, some physical approximations can be decided when modelling the microgrid as long as the model correctly reflects the microgrid operations. As an example, the loads (such as a building or thermal load) can be considered as non-controllable but can be taken into account in the method according to the present disclosure by their forecasted power inputs. As another example of approximation, during time where the CHP device does not cover the full thermal load of the microgrid, the auxiliary heat source can be considered to provide the complement.

Among the energy sources and loads depicted in FIG. 1, only the CHP device 120 and auxiliary heat source 130 models are developed in detail below.

The CHP model can consist of relationships between the usable energy (electric and thermal outputs) of the CHP device and the gas consumption (energy input) can be expressed by the following set of mixed-integer-linear equations:

$$F_{CHP,t}=a(P_{CHP,t}+H_{CHP,t})+b\ X_{CHP,t} \tag{1}$$

$$P_{CHP,t}/H_{CHP,t}=R \tag{2}$$

$$F_{CHP,t} \leq X_{CHP,t} \cdot F_{CHP,MAX} \quad (3)$$

$$F_{CHP,t} \geq \gamma \cdot X_{CHP,t} \cdot F_{CHP,MAX} \quad (4)$$

In relation (1), $F_{CHP,t}$ is the consumed fuel (i.e. energy input of the CHP device, such as natural gas) at time t, $P_{CHP,t}$ and $H_{CHP,t}$ are the electric and thermal outputs at time t and $X_{CHP,t}$ is the operation state of the CHP device at time t which is 0 when it is turned off and 1 when it is running.

The relation (1) is normally non-linear, and has been approximated by the MPC-based application as a linear regression with constants a and b being gas-power conversion constant parameters. If the linear approximation given above was not sufficiently precise, a piece-wise linear approximation of this non-linearity could be implemented as proposed by A. Hirsch, Y. Parag, J. Guerrero, Microgrids: *A review of technologies, key drivers, and outstanding issues, Renewable and Sustainable Energy Reviews*, vol. 90, pp. 402-411, 2018, the content of which being incorporated by reference.

The ratio R in relation (2) between the electric output $P_{CHP,t}$ and thermal output $H_{CHP,t}$ can be approximated as being constant over the full operation range of the CHP device.

Relation (3) complements relation (1) to force the electric and thermal outputs $P_{CHP,t}$ and $H_{CHP,t}$ to be 0 at time t, when $X_{CHP,t}=0$.

Relation (4) forces the CHP device to run above a certain minimum output power which is defined by a scalar $\gamma$ comprised between 0 and 1. The scalar $\gamma$ represents the fact that the CHP device should not run at arbitrarily low powers, since this would damage the machine. In addition to these relations (1)-(4), minimum run-time constraints and minimum-off-time constraints could be added to the CHP model, as for example proposed by A. Parisio, C. Del Vecchio, and A. Vaccaro. *A robust optimization approach to energy hub management*. International Journal of Electrical Power & Energy Systems, 42(1), 98-104, 2012, the content of which being incorporated by reference.

The auxiliary heat source model consist of a linear relationship between the consumed fuel $F_{AUX,t}$ (e.g. natural gas) and the produced useful heat $H_{AUX,t}$:

$$H_{AUX,t} = \eta_{AUX} LHV\, F_{AUX,t} \quad (5)$$

In relation (5), $F_{AUX,t}$ is the fuel consumption of the auxiliary heat source at time t, $H_{AUX,t}$ is the thermal output (e.g. produced useful heat) at time t, $\eta_{AUX}$ is the efficiency of the auxiliary heat source which is assumed to be constant over the full operation range and LHV is the low heating value of the natural gas.

Although only the CHP model and auxiliary heat source model are detailed above, it is understood that any other energy sources and loads can be modelled in a similar way, if necessary, by taking into account some additional approximations or assumptions. Besides, the models given above are for exemplary purposes and other models known to the skilled person in the art may be selected. The final model of the microgrid ultimately depends on the specific structure and arrangement of each energy source or load to be considered in the microgrid.

Figure 3:
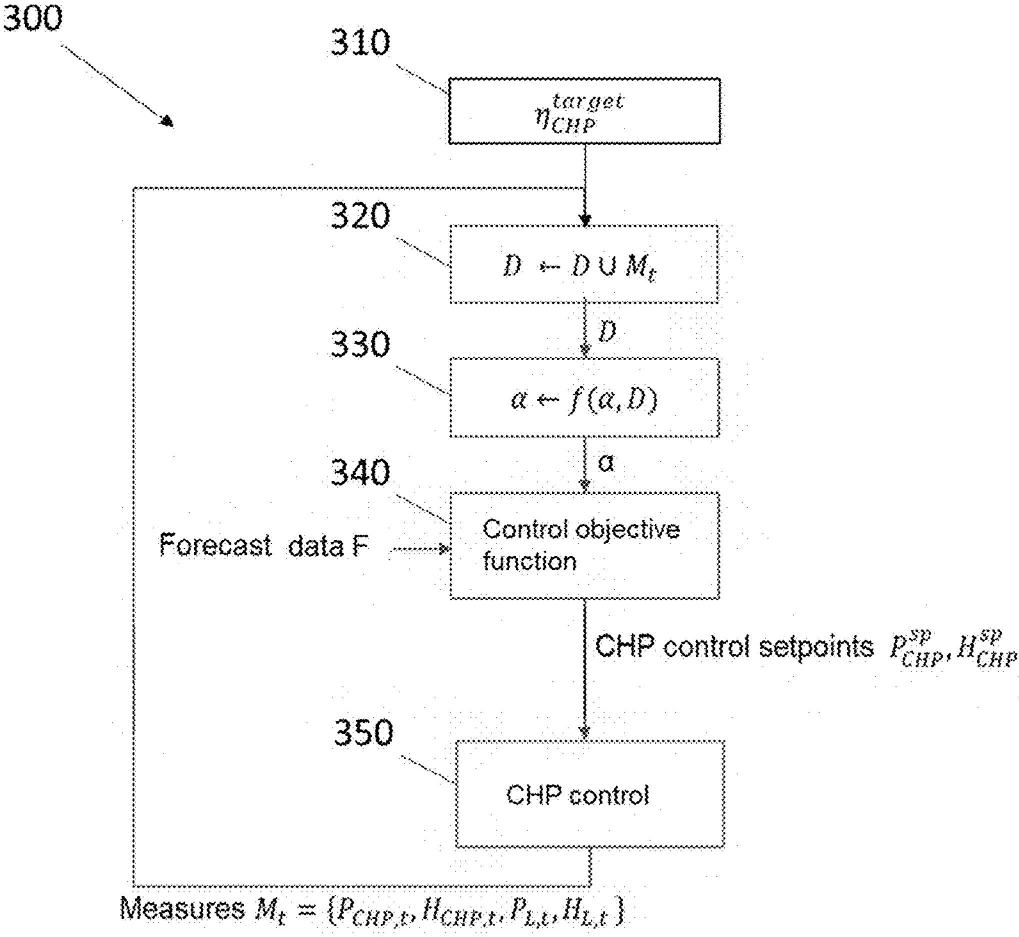
FIG. 3 is a high-level workflow illustrating a method performed by the microgrid controller according to an embodiment of the present disclosure.

Based on the model of the microgrid, and now referring to the embodiment of FIG. 3, the microgrid controller is adapted to take responsive actions, and more particularly to send control setpoints to the CHP based on updated historical data D and forecast data F. More particularly, the method is to make sure that the cumulated CHP efficiency over a full efficiency evaluation period, hereafter called "evaluation period", is greater than a desired CHP efficiency target $$\eta_{CHP}^{target}.$$

The evaluation period can be of a few months or a full year.

To this regard, the microgrid controller is configured to implement a first control objective function through a constraint formulation in which a penalty term $J_{Pen}$ is applied in case the CHP efficiency goes below the CHP efficiency target.

According to an embodiment, and in addition to the first objective function, the microgrid controller can be configured to implement simultaneously a second control objective function that is to minimize a cost term $J_{cost}$ composed of the utility tariffs for electricity and for gas in the microgrid.

A multi-objective optimization can therefore be used to manage and find the best solution for these objectives. Since these objectives might be nonlinear, conflicting, or incommensurable, the global optimal solution for the multi-objective optimization is generally achieved by cost function optimization algorithms. Known possible algorithms to that regard include Gradient Descent, Root Mean Squared Prop (RMS Prop) or Adaptive Moment Estimation (ADAM), but other algorithms may also be suitable.

According to this embodiment, the objective control function according to the present method thus includes the cost term $J_{cost}$ and the penalty term $J_{Pen}$, and can correspond to:

$$\text{Minimize } J_{Cost} + J_{Pen} \quad (6)$$

The cost term $J_{cost}$ represents the minimization of utility tariffs for electricity and for gas in the microgrid and the penalty term $J_{Pen}$ prevents the CHP efficiency to go below the CHP efficiency target.

FIG. 3 depicts a high-level workflow 300 illustrating the method performed on the microgrid controller as disclosed herein to deploy the control objective function as set out in relation (6).

The workflow 300 generally begins (at t=0) at stage 310 where the CHP efficiency target $$\eta_{CHP}^{target}$$

is set.

The CHP efficiency target $$\eta_{CHP}^{target}$$

is a minimum value of the CHP efficiency to be achieved over the evaluation period. As known per se, the calculation of CHP efficiency evaluates the combined CHP outputs (i.e., electric and thermal outputs) based on the fuel consumed. Also, the CHP efficiency $\eta_{CHP}$ can generally be calculated as the sum of the electric output and thermal output power divided by the fuel power consumed, as shown below:

$$\eta_{CHP} = \frac{P_{CHP} + H_{CHP.}}{F_{CHP}} \quad (7)$$

CHP devices typically achieve efficiencies ranging between 60% to 80%. According to the present disclosure, the CHP efficiency target $$\eta_{CHP}^{target}$$

can take any value within this range, or even be chosen to be higher than 80% or even higher than 85%.

Once the CHP efficiency target $$\eta_{CHP}^{target}$$

is set, stages 320 to 350 allow to determine the CHP control setpoints to ensure that this CHP efficiency target $$\eta_{CHP}^{target}$$

will be achieved over the evaluation period. To this end, stages 320 to 350 are implemented periodically in an iterative manner with a time step tc, wherein tc is an integer equal to 0, 1, 2, 3, etc. Each time step tc corresponds to a fixed time interval that can be of a few minutes (e.g. each 15 minutes) or of an hour. As a non-limitative and purely illustrative example, if the chosen time interval for the method described herein is 15 minutes for each time step, then time step 0 would correspond to the interval [0; 15], time step 1 would correspond to the interval [15; 30], time step 2 would correspond to the interval [30; 45], etc.

Stage 320 updates historical data D regarding the microgrid. As already stated above, the historical data D can be data including measures M of the power outputs and/or inputs of the energy sources and loads $P_{CHP}$, $P_L$, $H_{CHP}$, $H_{L,t}$, $F_{CHP}$. After each time step, measures M are added to previously acquired historical data D to obtain updated historical data D. Also, these historical data D are accumulated after each time step and added to the memory of the microgrid controller, such as the main memory or ROM.

Following stage 320, an efficiency weight parameter α based on the updated historical data D is updated at stage 330. The efficiency weight parameter α plays a significative role to attain the CHP efficiency target over the evaluation period. It allows to tune the importance of the economic cost $J_{Cost}$ versus the importance of achieving the CHP efficiency constraint depending on the penalty term $J_{Pen}$.

Updating or tuning the efficiency weight parameter α so that the CHP efficiency is greater than the CHP efficiency target $$\eta_{CHP}^{target}$$

can be a difficult task. If the efficiency weight parameter α was set to a fixed value, it is likely, that it would either be chosen too small, resulting in a CHP efficiency below the targeted minimum threshold $$\eta_{CHP}^{target},$$

or that it would be chosen too high which would result in an under-exploitation of the CHP and consequently in increased economic costs. To overcome this problem, stage 320 of the method applies an adaptive update method.

Figure 4:
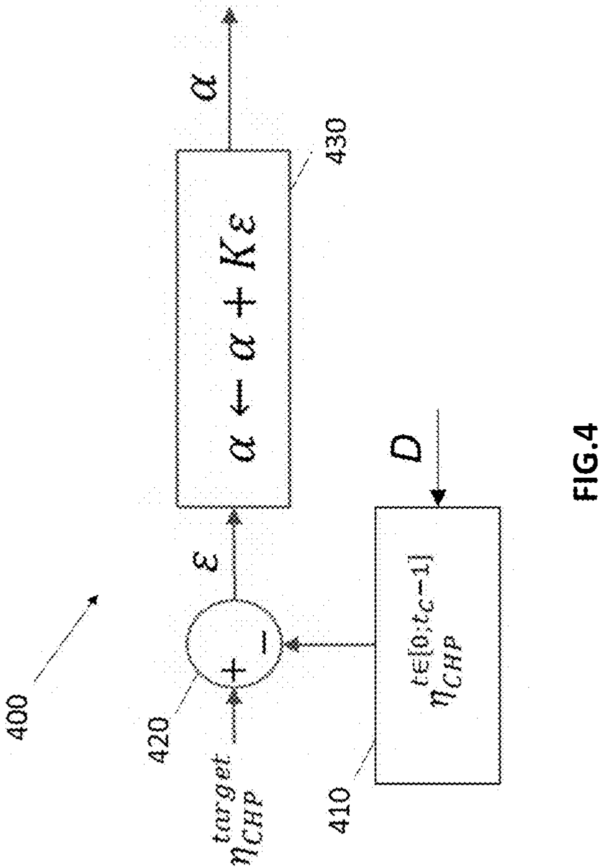
FIG. 4 are exemplary details 400 of a stage of the method illustrated in FIG. 3.

More precisely, FIG. 4 depicts exemplary details 400 of stage 330 as disclosed herein. Referring to the embodiment of FIG. 4, stage 320 is based on a proportional—integral (PI)-controller-like principle to allow an accurate and responsive correction of the control objective function.

More precisely, step 410 first computes a cumulated CHP efficiency $$\eta_{CHP}^{t\in[0;t_C-1]}$$

up to time step tc−1. The cumulated CHP efficiency $$\eta_{CHP}^{t\in[0;t_C-1]}$$

can be calculated according to the following equation:

$$\eta_{CHP}^{t\in[0;t_C-1]} = \frac{\sum_{t=0}^{t_C-1} \min(P_{CHP,t}, P_{L,t}) + \min(H_{CHP,t}, H_{L,t})}{\sum_{t=0}^{t_C-1} F_{CHP,t}} \tag{8}$$

In equation (8), the min( ) operator between the electric and thermal outputs $P_{CHP,t}$ and $H_{CHP,t}$ and the respective loads $P_{L,t}$ and $H_{L,t}$ allows to make sure that only the power produced by the CHP device and effectively consumed by the microgrid (e.g. the loads) are taken into account. In particular, the electric and thermal power CHP outputs that are wasted (such as heat loss) or not consumed in the microgrid (such as the power that could be exported via the utility grid) are not considered in the CHP efficiency calculation.

By "cumulated CHP efficiency", it should be understood the average CHP efficiency between the beginning of the evaluation period (t=0) up to the time the CHP efficiency is computed (such as at time step tc). More broadly, a CHP efficiency over a given period of time should be interpreted as an average value of the CHP efficiency during this given period of time.

Step 420 compares the cumulated CHP efficiency $$\eta_{CHP}^{t\in[0;t_C-1]}$$

up to time step tc−1 with the CHP efficiency target $$\eta_{CHP}^{target}$$

to obtain an error value ε, according to the following equation:

$$\eta_{CHP}^{target} - \eta_{CHP}^{t\in[0;t_C-1]} = \varepsilon \tag{9}$$

Step 430 then updates the weight parameter α based on the error value ε. According to an embodiment, the efficiency weight parameter α can be updated with the following equation:

$$\alpha^{tc}=\alpha tc-1+K\varepsilon \quad (10)$$

K is a constant that can be chosen arbitrarily depending on the desired sensitivity required for the method.

Once efficiency weight parameter α is updated, CHP control setpoints are determined based on forecast data F and the updated weight parameter α obtained at stage 340. To this end, the method dynamically adjusts the value of the penalty term $J_{Pen}$ in the microgrid controller at every time step tc depending on whether the cumulated CHP efficiency up to time step tc−1 is below or above the efficiency target.

The penalty term $J_{Pen}$ be defined as follows:

$$J_{Pen}(\alpha)=\alpha\max\left(0,\ \eta_{CHP}^{target}-\eta_{CHP}^{t\in[0;t_c+H-1]}\right) \quad (11)$$

The penalty term $J_{Pen}$ thus represents an artificial cost weighted by the efficiency weight parameter α for going below the CHP efficiency target $$\eta_{CHP}^{target}.$$

It takes a positive value in case the cumulated efficiency $$\eta_{CHP}^{t\in[0;t_c+H-1]},$$

goes below the CHP efficiency target $$\eta_{CHP}^{target}$$

and is 0 otherwise.

Tuning the efficiency weight parameter α is a difficult task, because its impact highly depends on the actual thermal and electric loads during the evaluation period, which are not known in advance. In fact, the control objective function has visibility only over the forecast period which is a limited portion of the evaluation period.

The cumulated CHP efficiency $$\eta_{CHP}^{t\in[0;t_c+H-1]},$$

over the evaluation period is defined according to the following equation. In this equation, the forecast period is divided into H time steps (H being an integer) corresponding to same time interval than time step tc. The evaluation period starts at t=0 and is evaluated up to the end of the forecast period at $t=t_c+H-1$.

$$\eta_{CHP}^{t\in[0;t_C+H-1]}=\frac{\sum_{t=0}^{t_C-1}\min(P_{CHP,t},P_{L,t})+\min(H_{CHP,t},H_{L,t})+\sum_{t=t_C}^{t_C+H-1}\min(P_{CHP,t},P_{L,t})+\min(H_{CHP,t},H_{L,t})}{\sum_{t=0}^{t_C-1}F_{CHP,t}+\sum_{t=t_C}^{t_C+H-1}F_{CHP,t}} \quad (12)$$

In both the numerator and the denominator of the cumulated CHP efficiency $$\eta_{CHP}^{t\in[0;t_c+H-1]},$$

the first sum corresponds to the cumulated values from the beginning of the evaluation period at t=0 up to the current time tc−1. These terms are fixed, known and can simply be computed based on updated historical data D, such as $P_{CHP}$, $P_L$, $H_{CHP}$, $H_L$ and $F_{CHP,t}$. In contrast, the second sum corresponds to the forecast period where $P_L$, $H_L$ are the forecasted electric and thermal energy consumption over the forecast period and $P_{CHP}$, $H_{CHP}$ and $F_{CHP}$ are decision variables of the microgrid model.

According to the embodiment in which the method also aims at minimizing the energy costs composed of the utility bills for electricity and for gas, the cost term $J_{cost}$ can be computed as follows:

$$J_{Cost}=\sum_{t=t_C}^{t_C+H-1}C_t^{Buy}\cdot\max(0,P_{G,t})+\sum_{t=t_C}^{t_C+H-1}C_t^{Sell}\cdot\min(0,P_{G,t})+C^{DCM}\cdot\max_{t\in[t_C;t_C+H]}(0,P_{G,t}-P_{DCMlimit}(t_C))+\sum_{t=t_C}^{t_C+H-1}C_t^{GAS}\cdot(F_{CHP,t}+F_{AUX,t}) \quad (13)$$

$$C_t^{Buy},\ C_t^{Sell}$$

are the variable energy buying and selling prices. $P_{G,t}$ is the power consumed from the utility grid at time t. $P_{DCMlimit}(t_c)$ is the grid power peak threshold at the current time step $t_c$ which shall not be exceeded.

$$C_t^{Gas}$$

is the gas price at time t.

Minimizing the sum of the cost term $J_{Cost}$ and the penalty term $J_{Pen}$ according to relation (6) requires respecting the relevant microgrid control model constraints. The following set of linear constraints represents the system model in the control optimization problem:

$$P_{G,T}=P_{L,t}-P_{CHP,t}+P_{OTHER,t}\forall\ t\in\{t_C,\ \ldots\ ,t_C+H-1\} \quad (14)$$

$$0=H_{L,t}-H_{CHP,t}\pm H_{AUX,t}\forall\ t\in\{t_C,\ \ldots\ ,t_C+H-1\} \quad (15)$$

$$\eta_{CHP}^{t\in[0;t_C+H-1]}=\frac{\sum_{t=0}^{t_C-1}\min(P_{CHP,t},P_{L,t})+\min(P_{CHP,t},P_{L,t})+\sum_{t=t_C}^{t_C+H-1}\min(P_{CHP,t},P_{L,t})+\min(H_{CHP,t},H_{L,t})}{\sum_{t=0}^{t_C-1}F_{CHP,t}+\sum_{t=t_C}^{t_C+H-1}F_{CHP,t}} \quad (16)$$

$$CHP\text{ physical model contraints }(1)-(4)\forall\ t\in\{t_C,\ \ldots\ ,t_C+H-1\} \quad (17)$$

$$\text{Auxiliary boiler physical model constraints }(5)\forall\ t\in\{t_C,\ \ldots\ ,t_C+H-1\} \quad (18)$$

Constraint (14) and (15) are the electric and thermal energy balance equations. Constraints (16) implements the cumulated efficiency of the CHP over the current efficiency evaluation period. Finally, the constraint sets (17) and (18) implement the physical model equations of the CHP device and the auxiliary heat source which have already been provided in detail above, in particular in relations (1)-(5).

This set of constraints can be easily implemented by the MPC-based application. In particular, the min( ) operator in constraint (16) can be efficiently implemented in a linear programming fashion or algorithms by adding additional auxiliary variables. Since this is part of the standard toolset in linear programming, this technical detail is not further developed in detail.

In stage 350, CHP control setpoints corresponding to the electric and thermal outputs of the CHP device $$P_{CHP}^{sp}, H_{CHP}^{sp}$$

during the time step tc are computed by solving the control objective function. These control setpoints $$P_{CHP}^{sp}, H_{CHP}^{sp}$$

are sent by the microgrid controller to the CHP device to command the CHP device accordingly until next time step tc+1.

Stages 320 to 350 use a sliding window method, wherein a window of a length equal to the forecast period, moves times step after time step until covering the evaluation period, and the method described herein is performed repeatedly over the data in the window. Also, stages 320 to 350 are repeated for each successive time step with newly-acquired measures M being used to update historical data D and new forecast data F. The method stops when the evaluation period has been covered.

Figure 5A:
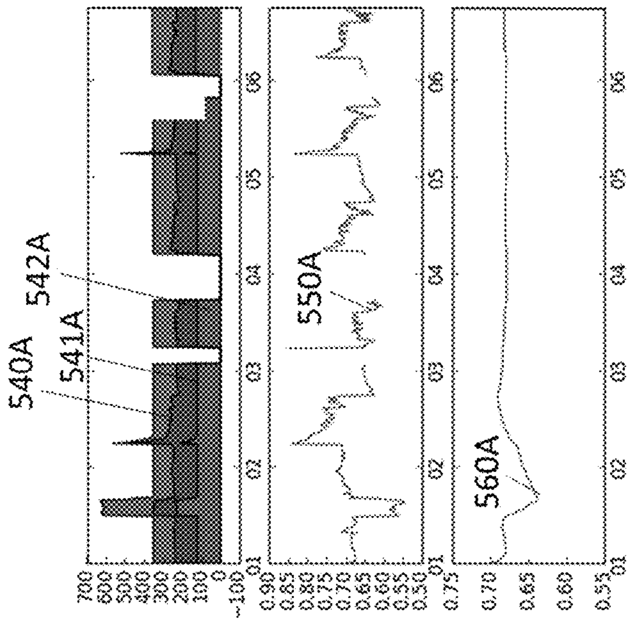
FIG. 5A is an exemplary microgrid operation with implementation of the method according to the present disclosure.
Figure 5A:
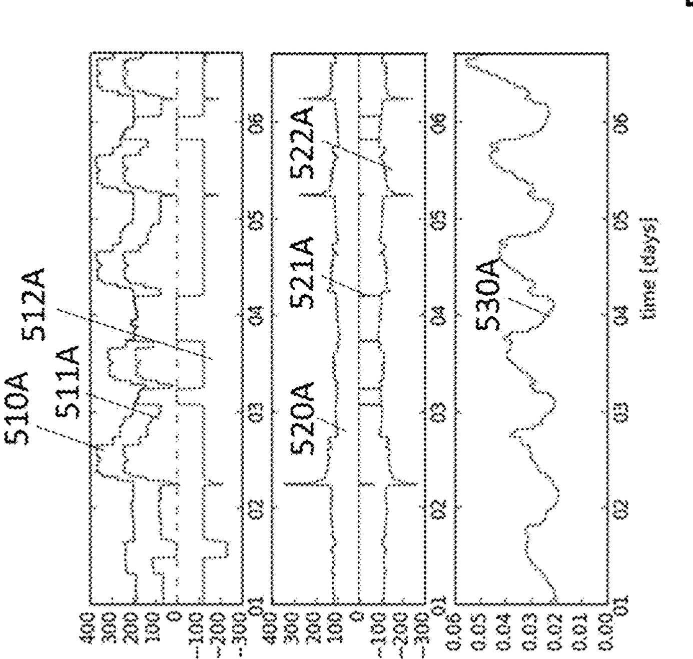
Figure 5B:
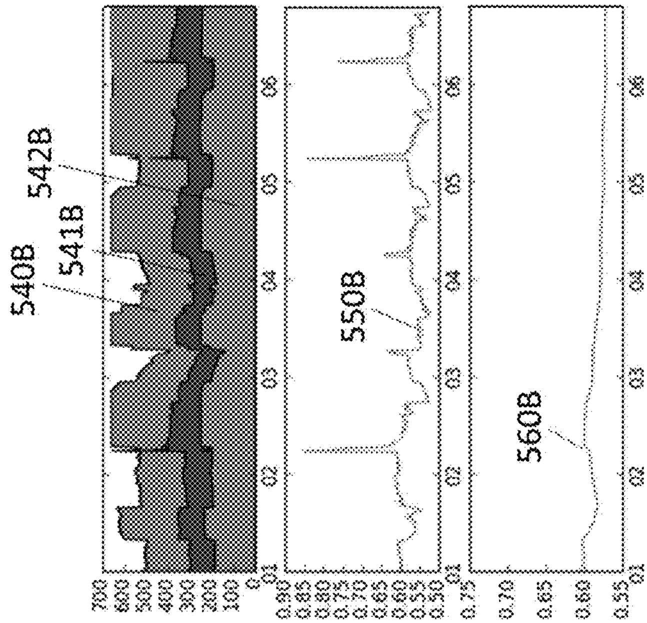
FIG. 5B is the exemplary microgrid operation illustrated in FIG. 5A without implementation of the method according to the present disclosure.
Figure 5B:
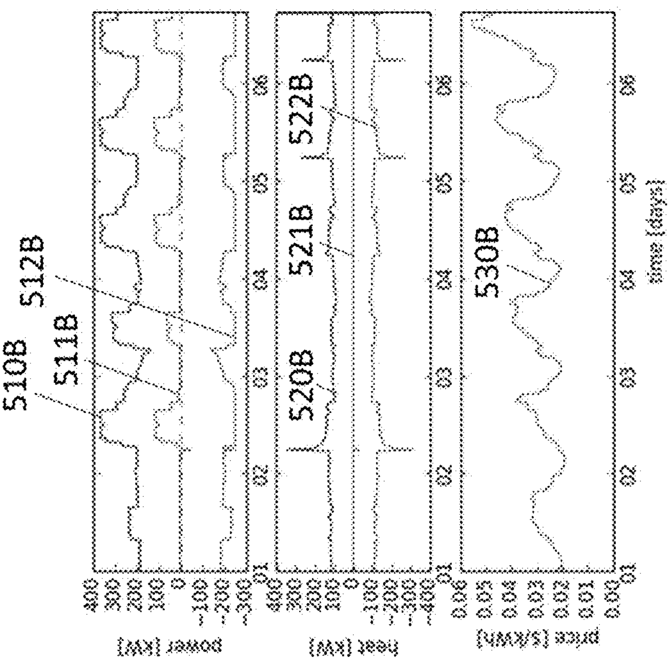

FIG. 5A and FIG. 5B are exemplary microgrid operations assessed through simulation. In the exemplary microgrid operations of FIG. 5A and FIG. 5B, the microgrid comprises a building with electric and thermal loads, equipped with a CHP device and an auxiliary heat source. Furthermore, the building is subject to a dynamic electricity price which varies from one day to another and it is published by the utility on a day-ahead basis.

FIG. 5A and FIG. 5B show the simulated microgrid operations or behaviour over one exemplary week. In FIG. 5A, the method as described above is implemented with a CHP efficiency target $$\eta_{CHP}^{target} = 0.68,$$

while FIG. 5B shows the same results without any efficiency target set.

Each figure FIG. 5A and FIG. 5B comprises six plots. Each corresponding plot in FIG. 5A and FIG. 5B comprises the same numerical reference with a respective specific alphabetical suffix.

The top-left plot shows the electric powers of the loads 510, the utility grid 511 and the CHP device 512. The middle-left plot shows the thermal powers of the load 520, the auxiliary heat source 521 and the CHP device 522. The bottom-left plot shows the dynamic electricity price 530.

The plots on the right provide some more details on the CHP behaviour. The top-right plot shows the CHP gas energy consumption and which portions of this energy are consumed by the electric 542 and thermal building loads 541 and what are amount is lost 540. The middle-right plot shows the instantaneous CHP efficiency 550 and the bottom-right plot the cumulated CHP efficiency 560, starting at the beginning of a week.

When comparing the results illustrated by the FIG. 5A and FIG. 5B, several observations can be made.

The cumulated CHP efficiency target of 68% is well respected as can be seen in the curve 560A, while without CHP efficiency target, the cumulated efficiency by the end of the simulated week lies at about 57% as can be seen in the curve 560B.

To achieve the CHP efficiency target of 68%, the CHP device is most of the time operated at reduced rates (541A and 542A), so that a maximum of both electric and thermal output is consumed locally. In contrast without the CHP efficiency target, the CHP device is operated to deliver a maximum of the electric load (curve 542B), accepting to recover only a small portion of the thermal energy (curve 541B). This is because from a purely economic standpoint, it is more cost efficient to produce electricity from the CHP device rather than to buy it from the utility grid even if the thermal losses are high.

Furthermore, to achieve the CHP efficiency target of 68%, the CHP device is turned off during some time periods (curve 550A) where otherwise the cumulated CHP efficiency would drop too much. These time periods coincide with low energy price periods which illustrates the interest for a forecasting-based receding horizon microgrid controller.

The steps of a method described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, or any other form of storage medium known in the art. An exemplary storage medium may be coupled to the processor such the processor can read information from, and write information to, the storage medium. In the alternative, the storage medium may be integral to the processor.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for controlling a Combined Heat and Power (CHP) device of a microgrid, the method comprising at least the steps of:

a) setting a CHP efficiency target corresponding to a minimum value of a CHP efficiency over an evaluation period;

b) updating historical data regarding the microgrid over a time step;

c) computing a value of the CHP efficiency based on the updated historical data;

d) comparing the CHP efficiency target and the computed CHP efficiency value;

e) updating an efficiency weight parameter based on the comparison to achieve the CHP efficiency target over the evaluation period;

f) determining CHP control setpoints based on forecast data and on the updated efficiency weight parameter; and g) controlling the CHP to operate based on the CHP control setpoints such that the CHP device operates at a reduced rate for at least a portion of the evaluation period and such that the CHP device is turned off during a period of the evaluation period to avoid a drop in a cumulated CHP efficiency.

2. The method according to claim 1, wherein the forecast data comprise forecasted electric and thermal energy consumption of the microgrid over a forecast period.

3. The method according to claim 2, wherein the forecast period is a portion of the evaluation period.

4. The method according to claim 2, wherein the step f) of determining CHP control setpoints comprises a sub-step of computing a control objective function that minimizes a penalty term $J_{Pen}$, wherein the penalty term $J_{Pen}$ corresponds to:

$$J_{Pen}(\alpha) = \alpha \max\left(0, \eta_{CHP}^{target} - \eta_{CHP}^{t\in[0:t_C+H-1]}\right)$$

wherein α is the updated efficiency weight parameter, $$\eta_{CHP}^{target}$$

is the CHP efficiency target and $$\eta_{CHP}^{t\in[0:t_C+H-1]}$$

is a cumulated CHP efficiency up to the end of the forecast period which is divided into H time steps.

5. The method according to claim 4, wherein the control objective function also minimizes energy costs composed of utility bills for electricity and for gas of the microgrid.

6. The method according to claim 1, wherein steps b) to g) are repeated in an iterative manner for successive time steps during the evaluation period.

7. The method according to claim 1, wherein the historical data comprise measures of an output of the microgrid, including a produced electric power and a produced thermal power of the CHP device.

8. The method according to claim 1, wherein the step d) of comparing the CHP efficiency target $$\left(\eta_{CHP}^{target}\right)$$

and the computed CHP efficiency value $$\left(\eta_{CHP}^{t\in[0:t_C-1]}\right)$$

comprises a sub-step of computing an error value (ε), according to the following equation:

$$\eta_{CHP}^{target} - \eta_{CHP}^{t\in[0:t_C-1]} = \varepsilon.$$

9. The method according to claim 8, wherein the step e) of updating an efficiency weight parameter ($\alpha^{tc}$) is based on the error value (ε) and the efficiency weight parameter ($\alpha^{tc-1}$) updated at a previous time step (tc−1), according to the following equation:

$$\alpha^{tc} = \alpha^{tc-1} + K\varepsilon$$

wherein K is a constant.

10. The method according to claim 1, wherein the microgrid additionally includes an auxiliary heat source.

11. A non-transitory computer-readable recording medium on which a software is stored to implement the method according to claim 1 when the software is executed by a processor.

12. A microgrid controller installed at a microgrid site and operable to control a combined heat and power (CHP) device of the microgrid, comprising:

a processor; and a storage device coupled to the processor and storing computer-readable instructions for performing a control objective function thereon;

wherein the control objective function, when executed by the processor, causes the microgrid controller to:

a) set a CHP efficiency target corresponding to a minimum value of a CHP efficiency over an evaluation period;

b) update historical data regarding the microgrid over a time step;

c) compute a value of the CHP efficiency based on the updated historical data;

d) compare the CHP efficiency target and the computed CHP efficiency value;

e) update an efficiency weight parameter based on the comparison to generate an updated efficiency weight parameter and to achieve the CHP efficiency target over the evaluation period; and f) control operation of the CHP based on the updated efficiency weight parameter to cause a cumulative CHP efficiency over the evaluation period to be at least the CHP efficiency target.

13. A method for controlling a Combined Heat and Power (CHP) device of a microgrid, the method comprising at least the steps of:

a) setting a CHP efficiency target corresponding to a minimum value of a CHP efficiency over an evaluation period;

b) updating historical data regarding the microgrid over a time step;

c) computing a value of the CHP efficiency based on the updated historical data;

d) comparing the CHP efficiency target and the computed CHP efficiency value;

e) updating an efficiency weight parameter based on the comparison to achieve the CHP efficiency target over the evaluation period; and f) controlling operation of the CHP based on the updated efficiency weight parameter to cause a cumulative CHP efficiency over the evaluation period to be at least the CHP efficiency target;

wherein the step d) of comparing the CHP efficiency target $$\left(\eta_{CHP}^{target}\right)$$

and the computed CHP efficiency value $$\left(\eta_{CHP}^{t\in[0:t_C-1]}\right)$$

comprises a sub-step of computing an error value (ε), according to the following equation:

$$\eta_{CHP}^{target} - \eta_{CHP}^{t\in[0:t_C-1]} = \varepsilon.$$

* * * * *